Aug. 5, 1924.

T. MORTON

FASTENING OF THE BUTTON TYPE

Filed Nov. 8, 1923     2 Sheets-Sheet 1

1,503,799

Inventor
T. Morton
By Marks & Clerk
Attys.

Aug. 5, 1924.

T. MORTON 1,503,799

FASTENING OF THE BUTTON TYPE

Filed Nov. 8, 1923  2 Sheets-Sheet 2

Inventor
T. Morton
By Marks + Clerk
Attys

Patented Aug. 5, 1924.

1,503,799

UNITED STATES PATENT OFFICE.

THOMAS MORTON, OF BIRMINGHAM, ENGLAND.

FASTENING OF THE BUTTON TYPE.

Application filed November 8, 1923. Serial No. 673,607.

*To all whom it may concern:*

Be it known that I, THOMAS MORTON, a British subject, residing at "Woodlea," Oxford Road, Moseley, in the city of Birmingham, England, have invented certain new and useful Improvements Relating to Fastenings of the Button Type, of which the following is a specification.

This invention has for its object to provide improved fastenings of the button type in which one part is inserted within or over the other and secured by a catch. Such fastenings are applicable to a variety of purposes, and particularly for securing the flexible hoods, screens or similar parts of motor and other vehicles.

The invention comprises the combination with one of a pair of detachably connectible parts, of a contractible and axially movable element which under endwise pressure and in co-operation with a surrounding conical or other rigid element can be caused to engage a groove, head or the like in the other part of the fastening for securing the two parts together, releasing of the parts being effected by an axial movement of the contractible element within the rigid element.

The invention also comprises the combinations and arrangements of parts hereinafter described.

In the two accompanying sheets of explanatory drawings:—

Figure 1:
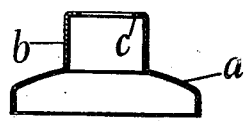
Figure 1 is a side elevation, and Figure 2 a plan of a portion of the body part of a fastener constructed in accordance with this invention.
Figure 2:
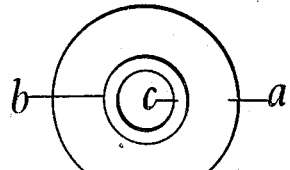
Figure 11:
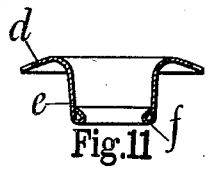
Figures 11 and 12 are sectional elevation and plan of another portion of the body.
Figure 13:
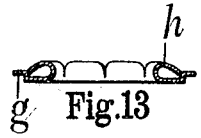
Figures 13 and 14 are sectional elevation and plan of a washer used in the body construction.
Figure 12:
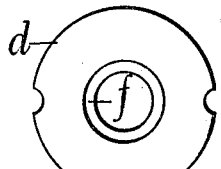
Figure 14:
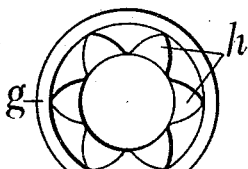
Figure 18:
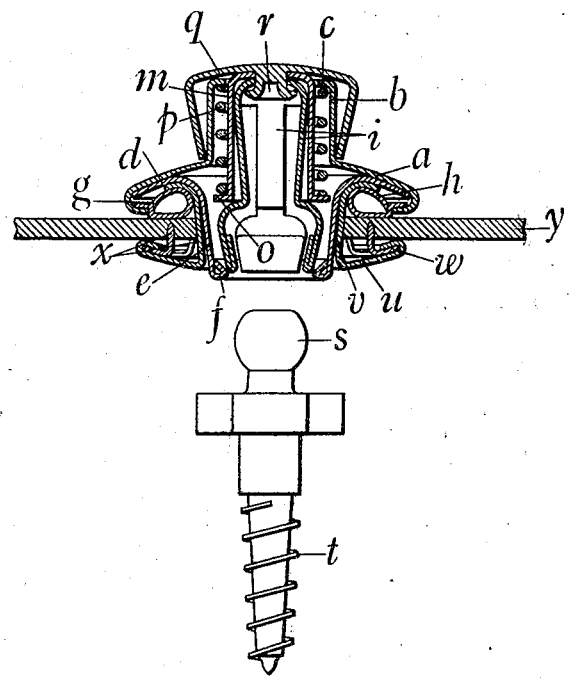
Figure 18 illustrates the complete fastening, the two main portions being separated and one shown in section.

In constructing a two part button fastening as shown, one of the body parts $a$ is formed from a flanged disc or the like having a hollow central boss $b$ projecting from one side (Figures 1 and 2). The outer end of the boss is turned inwards to form a narrow shoulder $c$. To the inner side of the disc is secured by turning over the outer flange of the disc, a plate $d$ (shaped as shown in Figures 11 and 12) having a hollow central boss $e$ of slightly conical form. This portion constitutes the rigid element above mentioned. The open end of the conical boss is also preferably turned inwards to form a narrow shoulder $f$. Instead of imparting a conical shape to this boss it may be provided with a rounded internal shoulder, seating or the like for the purpose hereinafter described. At the underside of the plate $d$ is placed a washer $g$ constructed as shown in Figures 13 and 14. This washer is formed from a dished ring which in its initial condition comprises a central cylindrical portion. This latter is slit along its length at a number of positions and the parts between the slits are subsequently bent down to form the slightly flexible pieces $h$. The washer $g$ is secured at the outer side of the plate $d$ by turning over it the flange of the disc $a$ as shown in Figure 18. Whilst the peripheral portion of the washer $g$ is tightly gripped between the edge of the plate $d$ and the turned-over flange of the disc $a$, a small space is left between the parts $h$ and the adjacent surface of the plate $d$ to accommodate a part of an eyelet to be hereinafter described.

Figure 9:
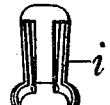
Figures 9 and 10 are elevation and inverted plan of the said element.
Figure 10:

Within the pieces $a$ and $d$ is arranged the gripping element $i$. This is shaped as shown in Figures 9 and 10 and is slotted at two or more positions for the greater part of its length, so that at one end the element is flexible. At the flexible end the gripping element is preferably formed with a bulbous enlargement, and the metal is also preferably turned inwards or folded over to afford additional strength. Also a central hole $j$ is provided in the closed end.

Figure 3:
Figure 3 and 4 are sectional elevation and plan of a spring supporting sleeve.
Figure 4:
Figure 7:
Figure 7 is an elevation of the spring.
Figure 8:
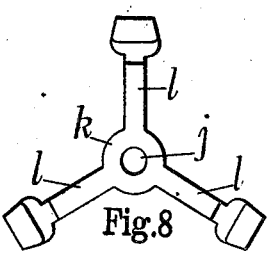
Figure 8 is a plan of the piece from which the gripping element is formed, whilst

This element may be made from a sheet metal blank as shown in Figure 8 consisting of a small central disc $k$ with two or more (preferably three) radiating strips $l$, the outer end of each of which is folded over to give the required extra strength at that part as above mentioned. The disc is subsequently dished and the strips caused to assume the approximately cylindrical form shown in Figures 9 and 10. In conjunction with this element $i$ is arranged an outer sleeve $m$ (Figures 3 and 4) which is formed with a closed end having a central hole $n$ and an external flange $o$ at the opposite end. The sleeve extends from the closed end to near the bulbous portion of the flexible element $i$. Over the sleeve is arranged a spiral spring $p$ (Figure 7) which abuts against the flange $o$ on the sleeve. The spring by acting on the flange of the sleeve exerts a purely axial thrust. If it were arranged to act directly on the part $i$ it would tend to produce an undesirable inward pressure on the flexible ends of the part $i$. It is important that the contraction of the said ends should be produced solely by their interaction with the internal part $f$ of the element $e$.

Figure 5:
Figure 5 is a sectional elevation, and Figure 6 a plan of the operating knob.
Figure 6:

In assembling the parts the spring $p$, sleeve $m$ and flexible element $i$ are placed within the boss $b$ of the portion $a$ above mentioned, and over the exterior of the boss a hollow knob $q$ (Figures 5 and 6) is placed, this being then secured to said sleeve and flexible element by a central rivet $r$ which is preferably formed integrally with the knob and passes through the holes in the ends of the sleeve and flexible element. One end of the spring abuts against the shoulder at the outer end of the sleeve as already stated. The other end abuts against the flange $c$ of the body part $a$. Due to the endwise pressure of the spring on the sleeve the free end of the flexible element is pressed against the conical or like portion $f$ of the boss $e$ on the plate $d$ secured to the part $a$, and the said end of the flexible element is thereby contracted. A pull applied to the outer knob causes the sleeve and the flexible element to be moved axially against the spring and by withdrawing the flexible element from the rigid surrounding conical boss with which it co-operates permits the free end of the flexible element to expand.

The other part of the fastening comprises a spherical, grooved, shouldered or other head $s$ over which the above described flexible or contractible gripping element $i$ can pass, the head being secured to the part on which it is mounted by a screw stem $t$ or other suitable means.

Figure 15:
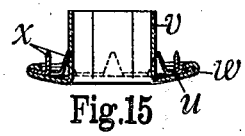
Figures 15 and 16 are sectional elevation and plan of an eyelet which co-operates with the body for securing the latter in position.
Figure 16:
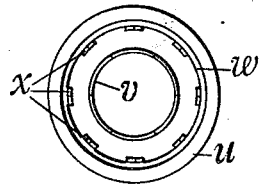
Figure 17:
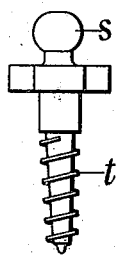
Figure 17 is an elevation showing one form of the complementary part of the fastening.

The part containing the flexible gripping element is secured to a canvas or other screen or covering or the like by a suitable eyelet. The eyelet construction shown in the drawings is especially suitable for heavy fabrics. This comprises a thin metal disc or washer $u$ (Figures 15 and 16) formed with a central cylindrical projection $v$ on one side, which projection is slit or divided at a number of positions so that after insertion through the fabric it can be engaged with the main portion of the fastening. In conjunction with the washer is provided a ring $w$ formed with teeth $x$ which engage the fabric $y$, this ring being secured by turning over it the outer edge of the washer $u$. When attaching the eyelet the part $v$ after insertion into the fabric is placed over the part $e$ and under endwise pressure the ends of the part $v$ are caused to expand and bend over into the space between the parts $h$ and $d$, the slight resiliency of the part $h$ enabling a tight grip and secure connection of the fastening and the eyelet to be obtained.

In use the one part of the button is pressed over the other, and the latter is engaged by the flexible gripping element in the former. Any tendency to separate the parts is resisted by the interaction of the gripping element and the rigid portion surrounding the same. To disconnect the parts the knob is pulled outwards as above mentioned and this causes the flexible element to release the other part which it engages.

The form, size and mode of construction of the components of fastenings constructed in accordance with this invention may be varied to meet different requirements.

Having thus described my invention what I claim as new and desire to secure by Letters Patent is:—

1. In a fastening comprising a pair of detachably connected parts, the combination comprising a pair of components constituting the body of one of the detachably connected parts, one of the components comprising a flanged disk having formed on one side of it a boss with an internal flange at its outer end, the other component comprising a plate also formed with a boss, said last mentioned boss being adapted to provide an annular seating, a contractible and axially movable element arranged within the said components, a spring for pressing said element against said seating, and external means for actuating said element.

2. In a fastening as claimed in claim 1, the combination with the contractible and axially movable element, of a sleeve, said spring being mounted on and cooperating with the sleeve, and said external means for actuating said element consisting of a knob arranged to also actuate said sleeve.

3. In a fastening as claimed in claim 1, the combination with the contractible and axially movable element, of a sleeve, said spring being mounted on and cooperating with the sleeve, and said external means for actuating said element consisting of a knob arranged to actuate said sleeve and to enclose the boss of said disk.

4. A fastening as claimed in claim 1 in which the external means for actuating said element consists of a knob having an internal rivet secured to the contractible and axially movable element.

5. In a fastening as claimed in claim 1, the combination with the body part, of a slightly resilient washer, and an expansible eyelet having one end adapted to be secured between said body part and washer.

6. In a fastening of the type specified, the combination comprising a body part consisting of a pair of components each of which is in the form of a disc or plate having a boss on one side, the boss of one component being provided with an internal flange, and the boss of the other with a conical seating piece, a contractible and axially movable gripping piece having a bulbous enlargement at its flexible end adapted to co-operate with the said seating, a flanged sleeve surrounding said element, a spring located between the flange on the sleeve and the flange on one of the body components, an external hollow knob formed integrally with a rivet for connection with the said axially movable element, said knob being adapted to enclose the boss on one of the body components, a resilient washer secured to one side of the disc portion of the body part, an expansible eyelet having one end adapted to be secured between the said body part and washer, and complementary member of the fastening adapted to be detachably secured to the other by engagement with the said contractible and axially movable element, substantially as described.

In testimony whereof I have signed my name to this specification.

THOMAS MORTON